United States Patent [19]

Oosterling et al.

[11] 4,035,991
[45] July 19, 1977

[54] DEVICE FOR MOWING AND SUBSEQUENTLY CRUSHING CROP

[75] Inventors: Pieter Adriaan Oosterling; Hendricus Cornelis van Staveren, both of Nieuw-Vennep, Netherlands

[73] Assignee: Multinorm, B.V., Nieuw-Vennep, Netherlands

[21] Appl. No.: 660,043

[22] Filed: Feb. 23, 1976

[30] Foreign Application Priority Data

Feb. 28, 1975 Netherlands .......................... 7502442

[51] Int. Cl.² .............................................. A01D 73/00
[52] U.S. Cl. ....................................... 56/1; 56/DIG. 1
[58] Field of Search ....................... 56/1, 14.1, DIG. 1, 56/192, 14.3, 14.4, 14.5

[56] References Cited

U.S. PATENT DOCUMENTS

| | | | |
|---|---|---|---|
| 3,115,737 | 12/1963 | Harrer et al. | 56/DIG. 1 |
| 3,797,207 | 3/1974 | Sawyer et al. | 56/DIG. 1 |

*Primary Examiner*—Jay N. Eskovitz
*Attorney, Agent, or Firm*—Snyder, Brown & Ramik

[57] ABSTRACT

A device for mowing and subsequently crushing crop comprises cutting members and a pair of relatively deflectable crushing rollers, at least one of which rollers is driven through a pivotable driving shaft, which passes through an ample opening in one side face and into the hollow roller.

23 Claims, 5 Drawing Figures

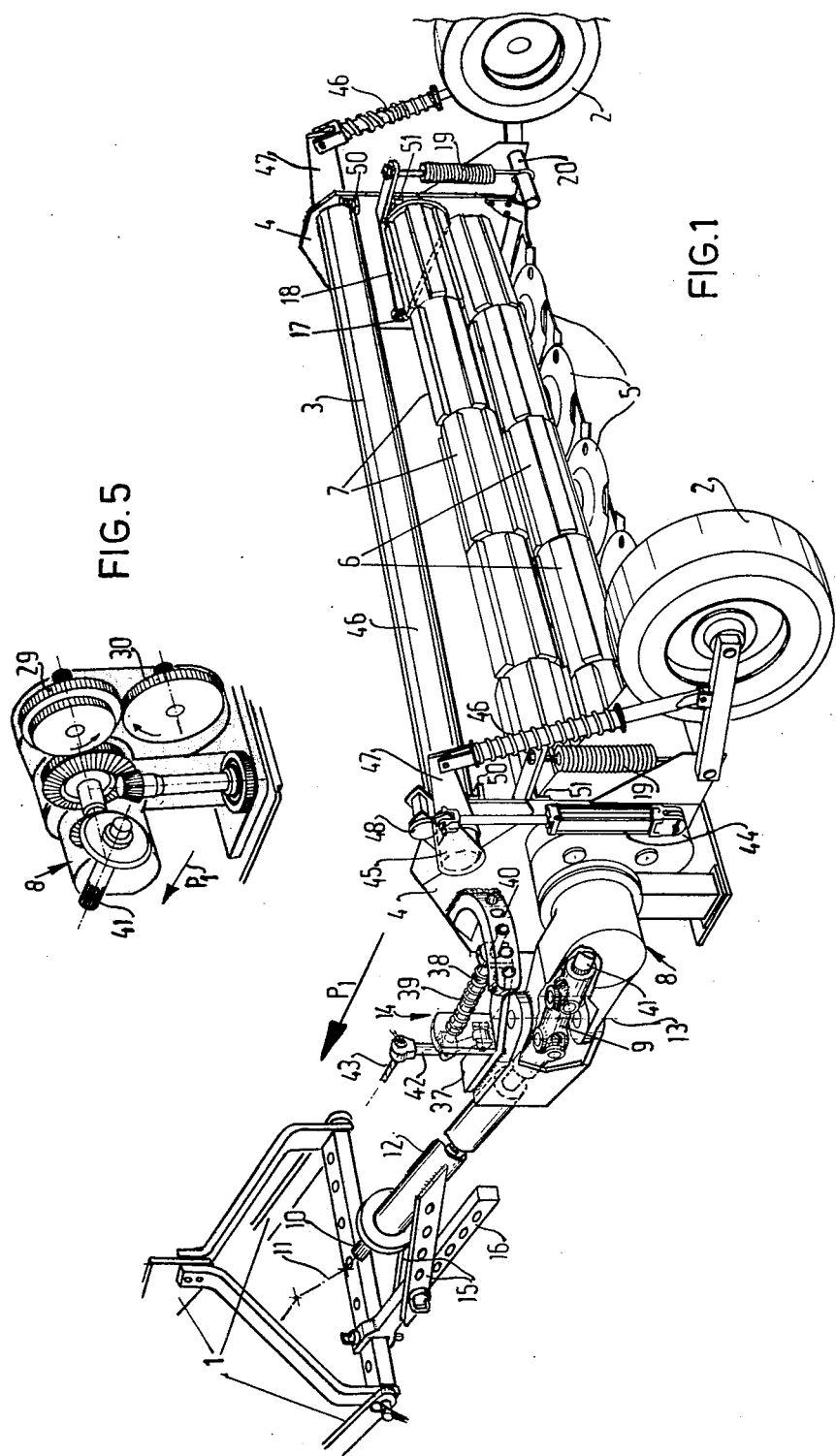

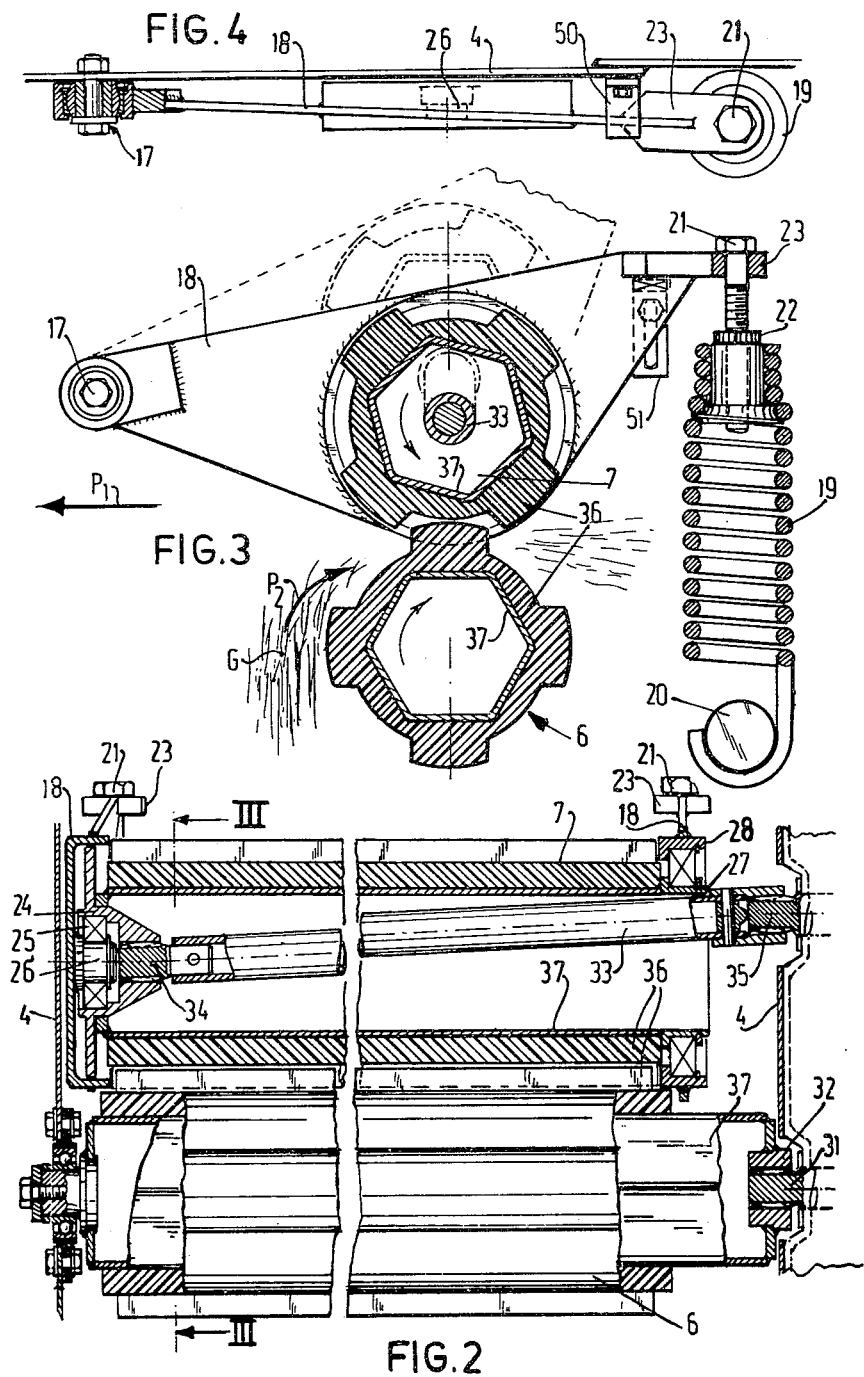

DEVICE FOR MOWING AND SUBSEQUENTLY CRUSHING CROP

The invention relates to a device for mowing and subsequently crushing crop, comprising cutting members moved in one direction and a pair of relatively deflectable crushing rollers extending transversely of said direction, at least one of which rollers is driven through a pivotable driving shaft.

With devices of the kind set forth it is common practice to drive the crushing rollers by means of pivotable driving rods, each of which is more or less aligned to the roller to be driven. Since with such devices the maximum permissible road transport width is determinative of the overall width of the implement, it is necessary to restrict the length of the crushing rollers and hence the width of the mowing range due to the minimum length required for the driving rods.

The invention has for its object to provide a mowing width of the device approximately equal to the overall width of the device, while it is a further object to reduce the number of required parts of the device, so that it can be manufactured in a simple manner and at low cost.

The invention provides a device in which at least the driven crushing roller is formed by a hollow body, the associated driving shaft being passed through an ample opening in the side face of the hollow body and being pivoted to a point in said hollow body.

The construction proposed by the invention has the advantage that the driving shaft occupying fairly much space is accommodated in the crushing roller and the end projecting out of the crushing roller can be coupled, for example, with a driving shaft extending in the direction of movement by means of a comparatively narrow orthogonal transmission. Owing to the ample opening receiving the driving shaft of the roller the deflectability of one roller relative to the other roller is maintained so that any greater or smaller quantity of cut crop can be allowed to pass undisturbed.

In order to ensure a quiet run the deflection of the pivotable driving shaft should be minimized and therefore the invention proposes to provide a driving shaft extending substantially throughout the length of the roller.

If it is desired to drive the two crushing rollers synchronously in opposite senses, the pair of rollers is driven via a set of meshing gear wheels in order to obtain a driving mechanism occupying a fairly narrow space, it being then preferred to couple one gear wheel through a pivotal clutch of the driving shaft with one roller and the other gear wheel directly with the other roller. As a result of the latter step comparatively few parts are required.

When the device is drawn and driven by an agricultural tractor, a tubular coupling element is arranged between the main frame of the device and the mounting device of the tractor, the main driving shaft for the cutting members and at least one of the crushing rollers being passed through said element.

Since in operation the drawn device is at the side of the tractor, viewed in the direction of travel, whereas it has to ride behind the tractor during road transport, said tubular coupling element is adapted to pivot between two end positions, that is to say, one or more operative positions and the road transport position with respect to the main frame and to be locked therein.

The abovementioned and further features and objects of the invention will become apparent from the following description of one embodiment of a device in accordance with the invention.

In the drawing:

FIG. 1 is a perspective rear view of a mowing and crushing device,

FIG. 2 is an axial sectional view and partly an elevation of a pair of crushing rollers arranged one above the other, FIG. 3 is a cross sectional view taken on the line III—III in FIG. 2, FIG. 4 is a plan view of the device shown in FIG. 3 and, FIG. 5 is an exploded view of the gear wheel mechanism employed in the embodiment shown in FIG. 1, the direction of view being the same as in FIG. 1.

The embodiment shown of the mowing and crushing device in accordance with the invention is drawn in the direction of the arrow P1 by an agricultural tractor (not shown), only the three-point lift 1 is shown.

The device comprises a main frame supported from two wheels 2 and mainly formed by side plates 4 extending in the direction of the arrow P1 and interconnected by the support of the cutting members 5. Said side plates 4 support the cutting members 5 arranged directly above the ground and constructed in the form of rapidly rotating discs, four of which are illustrated in FIG. 1. Above the cutting discs 5 is arranged a pair of crushing rollers 6 and 7 extending transversely of the direction of movement P1. These crushing rollers 6 and 7 disposed vertically one above the other are supported by the main frame in the manner to be described hereinafter.

The cutting members 5 and the crushing rollers 6 and 7 are driven through a gear box 8 arranged on side beyond the side plate 4, a pivotal coupling 9 and the main driving shaft 10 by the power take-off shaft (not shown) of the tractor, indicated only by a broken line 11.

A rigid connection between the main frame of the device and the mounting arms 1 of the tractor is established by means of a tubular connecting element 12 surrounding the main driving shaft 10. On the side facing the cutting members said element 12 is coupled through a hinge 13 having a vertical hinge pin with the main frame, a locking member 14 being provided for locking the coupling element 12 in at least two positions relative to the main frame, as will be explained more fully hereinafter.

On the side facing the tractor the coupling element 12 is provided with a coupling mechanism adjustable in a direction of length and height in order to ensure the attachment of the coupling element 12 to the mounting part 1 of the tractor. The coupling employed in the embodiment shown is formed by two plates 15 arranged at an angle to the element 12 and having arranged between them a connecting rod 16, which is adjustable in a direction of height. The connecting rod 16 is provided at its front end with a claw-shaped part, which can be rotatably coupled with the generally known toolbar of a three-point lift 1 or with the drawhook of the tractor for movement in the horizontal plane.

FIGS. 1, 2, 3 and 4 illustrate the specific disposition of the driving shaft relative to the crushing rollers 6 and 7 and further advantageous structural details.

In the embodiment shown the lower crushing roller 6 is directly supported from the side plates 4 of the main frame (see FIG. 2). The upper crushing roller 7, on the contrary, is journalled in a frame adapted to turn about a pivot pin 17 (see the right-hand side of FIG. 1 and FIGS. 3 and 4). Owing to this deflectable structure the gap between the two crushing rollers can match the thickness of the layer of crop to be crushed, designated by G in FIG. 3, the arrow P2 indicating the direction of passage of the crop. In order to ensure a satisfactory crushing effect each pivotal plate 18 is provided at the end remote from the pivot pin 17 with a tensile spring 19, which is otherwise secured to a pin 20 of the fixed frame 4. The stress of the spring 19 is adjustable by means of a screw spindle 21, which can be screwed to a greater or lesser extent into the spring and which can be locked in place by a nut 22. The head of the screw spindle 21 bears on a bracket 23 welded to the pivotal plate 18.

One end of the movable crushing roller 7 is provided with a hub 24, which is held by means of a fitting bearing 25 on a stub shaft 26 fastened to the pivotable plate 18. The other end of the crushing roller 7 is provided with a sleeve 27, the inner diameter of which substantially corresponds with the inner diameter of the crushing roller 7. Through a fitting bearing said sleeve 27 is supported from a bearing bushing 28 provided in the other pivotable plate 18.

Owing to the independent bearing and to the independent pivotability of the plates 18 the upper crushing roller 7 can move away from the lower, fixed crushing roller 6 to any position so that it may occupy a non-parallel, inclined position relative to the latter.

In the embodiment shown the two crushing rollers 6 and 7 are driven with the same circumferential speed but in opposite senses. Driving is obtained by the transmission of the rotation of the main driving shaft 10 through the gear box 8 to two gear wheels 29 and 30 being in mesh with one another (see FIG. 5). The lower gear wheel 30 is directly coupled with a coupling 31, which co-operates with a coupling sleeve provided at the end concerned of the lower crushing roller 6 (see FIG. 2). Since the lower crushing roller 6 is fixedly journalled in the side plates 4, it will not move with respect to the gear wheel 30. On the contrary owing to its freedom of movement relative to the gear wheel 29 the upper crushing roller 7 will perform a movement, since said gear wheel is coupled with the crushing roller 7 through a pivotable driving shaft 33.

The pivotable driving shaft 33 is provided at either end with hinge joints 34 and 35 respectively, the joint 34 being partly formed by the hub 24 of the roller 7.

According to the particular step proposed by the invention the pivotable driving shaft 33 extends inside the crushing roller 7 and in the rest position in which the gap between the two rollers is at a minimum it will occupy the position shown in FIG. 2. Owing to the wide opening of the sleeve 27 the crushing roller 7 can move upwards until the pivotable driving shaft 33 reaches the lower end of the sleeve 27. The extreme position of the roller 7 is indicated in FIG. 3 by broken lines and it is determined by a stop 50 adjustable fixed to each side plate 4.

Each crushing roller is enveloped in a rubber coating 36 having a toothed periphery, viewed in a cross-section. The rollers are relatively disposed and rotated synchronously so that a tooth of one coating enters the interstice between the teeth of the other coating. Obviously this will intensify the crushing effect. In order to prevent the coating 36 from turning about the rollers, the hollow pipe 37 formed by each roller has a polygonal, here hexagonal cross-section.

The coating 36 is furthermore subdivided into elements, the teeth of each element being turned through an angle relatively to the preceding teeth. This arrangement ensures a quiet run of the crushing rollers.

If it is desired for the crushing rollers not to touch one another, a stop 51 may be adjustably provided on each side plate 4 (see FIG. 3).

As stated above, the coupling pipe 12 between the device and the mounting structure of the tractor can be set in at least two positions. The pipe can be locked in said positions by means of the locking mechanism 14 formed by a support 37 fastened to the coupling pipe 12 and having two registering holes for receiving a slidable pin 38. The pin 38 is biassed by a spring 39 which urges the pin into holes of a circular support 40 corresponding to the desired positions. The support 40 is secured to one of the side plates 4 of the main frame. Moreover, the center of curvature of the support 40 coincides with the pivotal axis 9 of the hinge between the coupling pipe 12 and the gear box 8. It should be noted here that a pivotal joint is provided between the main driving shaft 10 and the input shaft 41 of the gear wheel system 8 preferably in the form of a double cross hinge (see the drawing). The structure is such that the center of said double cross hinge coincides with the aforementioned hinge shaft 9.

The pin 38 is released from the holes of the circular support 40 by means of a lever 42 arranged at the free end of the pin and linked through a pull-member 43 to the driver seat of the tractor.

From FIG. 1 it will be apparent that the operative positions can be occupied, when the pin 38 is not in the lefthand hole of the support 40, whereas the road transport position is attained with the pin in said hole. Therefore, in the operative positions the cutting members 5 will move directly above the ground, whereas in the road transport position they are moved upwards by the parallel structure by means of which the ground wheels 2 are connected with the main frame of the implement. This parallel structure is illustrated in FIG. 1; the device can be lifted by means of a cylinder-piston system 44, which bears on the one hand a side plate 4 and on the other hand on a lever 45, which is connected with the upper guide 47 of the parallel structure of the wheel.

The guides 47 are rigidly interconnected by the beam 3 rotatably arranged in the side plates 4. Springs 46 absorb the shocks of each wheel due to unevennesses of the ground. By separate adjustment of the bias stress of each spring the pressure of the device on the ground may be made lower on the right-hand side (see FIG. 1) than on the left-hand side so that the whole device remains in the desired manner in the track behind the tractor. The overall pressure on the ground can be centrally adjusted by means of a stop 48 co-operating with one of the guides 47. Said stop is formed by a square-section spindle fitting in a correspondingly shaped hole in a holder secured to the frame plate 4. A stop head eccentrical to the spindle provides the potential, in this case four positions of the guides 47 for varying the pressure on the ground of skids (not shown) arranged beneath the cutting members 5. The height of the cutting members above the ground can be adjusted by correctly setting the skids.

In order to avoid additional torsional torque on the bearings of the movable crushing roller 7, the center of the hinge pin 17 is located in the plane going through the center of the stub shaft 26 and the operational line of the spring 19 (see FIG. 4).

It should finally be noted that within the scope of the invention other embodiments are possible. It is, for example, not necessary for the lower roller 6 to be driven, it may freely rotate by the friction exerted by the crop to be crushed. Furthermore instead of arranging the crushing roller 7 so as to be movable, the roller 6 may be movable and be driven. In this case the spring 19 will not apply via the pivot plate 18 to the roller 7, but it will engage the roller 6 through an identical structure, the spring then exerting an upward force. Moreover, it may be imagined to use a structure in which both rollers are movable, the spring 19 then directly engaging the two rollers.

The hinge plate 18 may be replaced by a sliding structure, in which case the hinge pin 17 may be dispensed with.

As a matter of course, the device may be provided with its own prime mower so that the coupling pipe 12 for the tractor can be omitted.

What we claim is:

1. A crop harvesting and conditioning device which comprises cutting means for cutting a crop and crusher means operatively associated with said cutting means for receiving the cut crop and conditioning it prior to discharge from the device, the crusher means comprising a pair of rollers at least one of which is movable with respect to the other to vary the nip therebetween, and drive means for driving said one roller, the improvement wherein:
said one roller is hollow and said drive means includes a driving shaft projecting into one end of said one roller, with clearance, and having an inner end which is drivingly connected to said one roller in spaced relation to said one end thereof.

2. A device as claimed in claim 1 characterized in that the driving shaft covers substantially the whole length of the roller.

3. A device as claimed in claim 2 in which the two crushing rollers are synchronously driven in opposite senses, characterized in that the rollers are driven through a pair of relatively meshing gear wheels.

4. A device as claimed in claim 3, characterized in that one gear wheel is coupled through a hinge joint with the driving shaft and the other gear wheel is directly coupled with the other roller.

5. A device as claimed in claim 2 characterized in that the one roller is subjected to a bias force directed towards the other roller.

6. A device as claimed in claim 1 in which the two crushing rollers are synchronously driven in opposite senses, characterized in that the rollers are driven through a pair of relatively meshing gear wheels.

7. A device as claimed in claim 6 characterized in that one roller is subjected to a bias force directed towards the other roller.

8. A device as claimed in claim 6, characterized in that one gear wheel is coupled through a hinge joint with the driving shaft and the other gear wheel is directly coupled with the other roller.

9. A device as claimed in claim 8 characterized in that the one roller is subjected to a bias force directed towards the other roller.

10. A device as claimed in claim 1 characterized in that the one roller is subjected to a bias force directed towards the other roller.

11. In a crop harvesting and conditioning device, the combination of:
a frame adapted to be attached to a powered vehicle and including support means for engaging the ground surface;
cutter means mounted on said frame for cutting a crop;
crusher means carried by said frame and located adjacent said cutter means for receiving cut crop and crushing it;
said frame including a pair of space, upstanding said frame portions and said crusher means including a pair of opposed rollers located between said side frame portions, a pair of swing arms pivoted to said side frame portions and rotatably carrying one of said rollers, and spring means biassing said arms normally to pinch said rollers together; and
drive means for rotating said one roller, said drive means including a stub shaft rotatably about an axis fixed with respect to said frame and projecting through one of said side frame portions adjacent one end of said one roller, said one roller being hollow and presenting an enlarged opening at said one end thereof, and a driving shaft connected at one end to said stub shaft and projecting through said enlarged opening, with clearance, into said one roller, the opposite end of said driving shaft being drivingly connected to said one roller.

12. In a device as defined in claim 11 wherein the other end of said one roller is provided with a hub rotatably journalled in one of the swing arms, said driving shaft being connected to said hub.

13. In a device as defined in claim 12 wherein the other roller is journalled directly to said side frame portions.

14. In a device as defined in claim 11 wherein each swing arm is independently pivoted to an associated side frame portion and said spring means comprises a tension spring connected between each swing arm and an associated side frame portion, the pivot connection for each swing arm, the rotatable connection to the associated end of said one roller and the force exerted by the associated tension spring lying in a common plane.

15. A crop harvesting and conditioning device comprising in combination:
a frame having upstanding side portions and ground-engaging wheels carried by and trailing behind said side frame portions, a driving gear housing attached to the outer side of one of said side frame portions, a coupling pipe pivotally connected at its rearward end about a generally vertical axis to said gear housing and having means at its forward end for pivotal connection about a generally vertical axis to a powered vehicle, and means for selectively connecting said one side frame portion directly to said rearward end of the coupling pipe in at least two different angular positions whereby said device may track behind a powered vehicle in at least two laterally displaced positions relative thereto;
cutter means mounted between said side frame portions for cutting a crop;
crusher means located between said side frame portions for receiving cut crop and crushing it, said crusher means comprising a lower roller and an upper roller; and
drive means for driving at least one of said rollers, said drive means comprising a driven shaft projecting through said coupling pipe and adapted to be connected to the power take-off of the powered vehicle, a stub shaft projecting through said one side frame portion substantially in line with said one roller, gear means in said gear housing drivingly connecting said driven shaft and said stub shaft, and a driving shaft connecting said stub shaft to said one roller at a point remote from said one side frame member, said one roller being hollow to receive said driving shaft and having a hub at said point remote from said one side frame member to which said driving shaft is connected.

16. A device as defined in claim 15 including parallelogram linkage means connecting each ground-engaging wheel to said frame and including spring mechanism for supporting each side frame portion in desired height above the ground.

17. A device as claimed in claim 16 characterized in that the upward movement of the wheels relative to the frame is limited by at least one stop.

18. A device as claimed in claim 11 characterized in that said stop is adjustable.

19. A device as claimed in claim 18 characterized in that said stop is formed by a head eccentrically disposed on a shank, the eccentrical outer periphery of which co-operates with a stop surface associated with the parallel structure.

20. A device as claimed in claim 19 characterized in that said shank has a non-circular cross-section and can be inserted into a correspondingly shaped hole in the frame.

21. A device as claimed in claim 20 characterized in that said shank has a square cross-section.

22. A device as defined in claim 15 including a second stub shaft projecting through said one side frame in line with the other roller, said other roller having a first hub at one end connected to said second stub shaft and a second hub at its other end journalled in the other side frame portion.

23. A device as defined in claim 22 including a pair of trailing swing arms pivotally connected at their forward ends to said side frame portions and journalling the opposite ends of said one roller at their rearward ends, and spring means connecting the rearward ends of said trailing arms to said frame for urging said one roller toward the other.

* * * * *